Feb. 9, 1954
B. N. ABRAMSON
2,668,412
ONE SHOT ROCKET MOTOR STARTING SYSTEM
Filed July 17, 1952
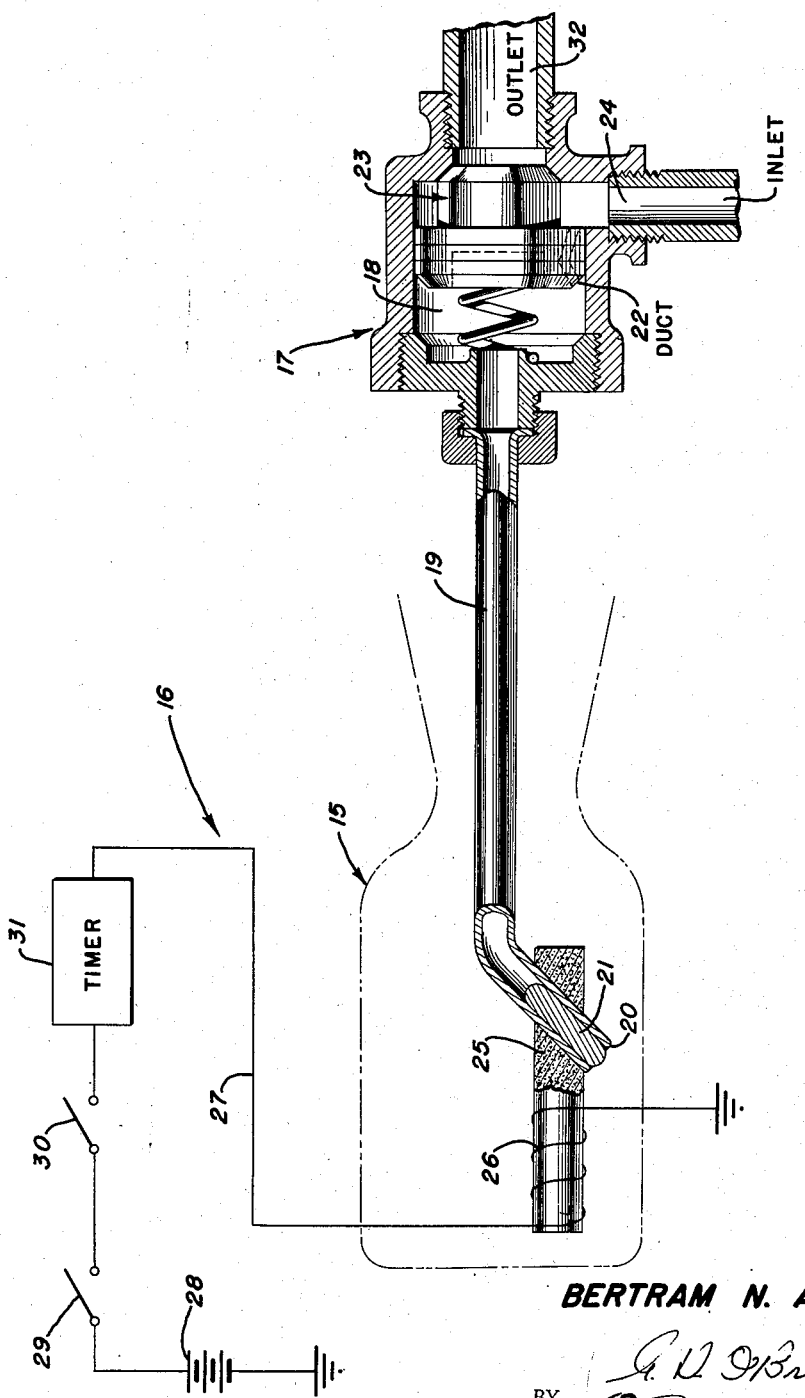
INVENTOR
BERTRAM N. ABRAMSON
BY
ATTORNEYS Patented Feb. 9, 1954

2,668,412

UNITED STATES PATENT OFFICE 2,668,412

ONE SHOT ROCKET MOTOR STARTING SYSTEM

Bertram N. Abramson, Whippany, N. J., assignor, by mesne assignments, to the United States of America as represented by the Secretary of the Navy Application July 17, 1952, Serial No. 299,484

1 Claim. (Cl. 60—39.14)

The present invention relates to control devices and more particularly to an improved starting system for a liquid propellant rocket motor.

An important object of the invention is to provide a switch controlled electric starting system for a rocket motor minimizing the consumption of electric energy and thus reducing the battery weight and space requirements for this flight article.

Another important object of the invention is the provision of a starting system as described which permits rapid starting of the rocket motor power plant.

Other objects and many of the attendant advantages of this invention will be readily appreciated as the same becomes better understood by reference to the following detailed description when considered in connection with the accompanying drawing wherein the single figure is a diagrammatic view showing the relative position of elements of the rocket motor starting system ready to start.

In the drawing which for the purpose of illustration shows only a preferred embodiment of the invention, the numeral 15 generally designates a liquid propellant rocket motor in fragmentary outline, equipped with the improved starting system 16 controlling the opening action of a starting valve 17. This valve, opening to admit liquid propellant from a pressurized source to the motor, may be of the general type disclosed in U. S. Patent 880,030 granted to F. M. Leavitt on February 25, 1908. The valve 17 is normally held closed by inlet pressure confined in a control chamber 18 communicating with a tube 19 having its end 20 closed by a fusible seal 21. Inlet fluid under pressure is admitted slowly to the control chamber 18 along a restricted duct 22 extending through the piston 23. The tube end seal 21 is formed of low temperature fusible alloy melting at 100° F.–400° F. to release the pressurized fluid from the control chamber so that the valve is released and permitted to open responsive to the pressure difference between the inlet 24 and the control chamber 18.

The sealed tube end 20 is inserted in a pyrotechnic igniter 25 encircled by a coil 26 of electrical resistance wire in circuit 27 with a six volt battery 28. Serially connected in the circuit 27 are an arming switch 29, a mechanically actuated firing switch 30 and a mechanically operated timing switch 31.

In operation, closing of the circuit 27 effects energization of the resistance wire 26, and the resultant heating of the wire to red heat sets off the igniter 25 in less than a second. Immediately thereafter the fusible alloy seal 21 is melted, releasing pressurized fluid from the control chamber 18 and thereby actuating valve 17 so as to admit liquid propellant through outlet 32 to the motor 15.

Obviously many modifications and variations of the present invention are possible in the light of the above teachings. It is therefore to be understood that within the scope of the appended claim the invention may be practiced otherwise than as specifically described.

What is claimed is:

In a starting system for a liquid propellant rocket motor, a trigger valve actuable to start said motor, and including a pressurized fluid chamber, means responsive to the release of pressurized fluid from said chamber for actuating said trigger valve, a tube connected to said chamber and having a discharge end for releasing said pressurized fluid, fusible material sealing said discharge end, a pyrotechnic igniter in contact with said discharge end operable to melt said fusible material, an electrical resistance heating element in contact with said igniter for firing the igniter, and switch controlled means energizing said heating element.

BERTRAM N. ABRAMSON.

References Cited in the file of this patent

UNITED STATES PATENTS

| Number | Name | Date |
|---|---|---|
| 880,030 | Leavitt | Feb. 25, 1908 |
| 2,626,655 | Trautman et al. | Jan. 27, 1953 |